April 7, 1942.  J. B. GIERN ET AL  2,278,845
RETRACTING BORING DEVICE
Filed Jan. 8, 1940
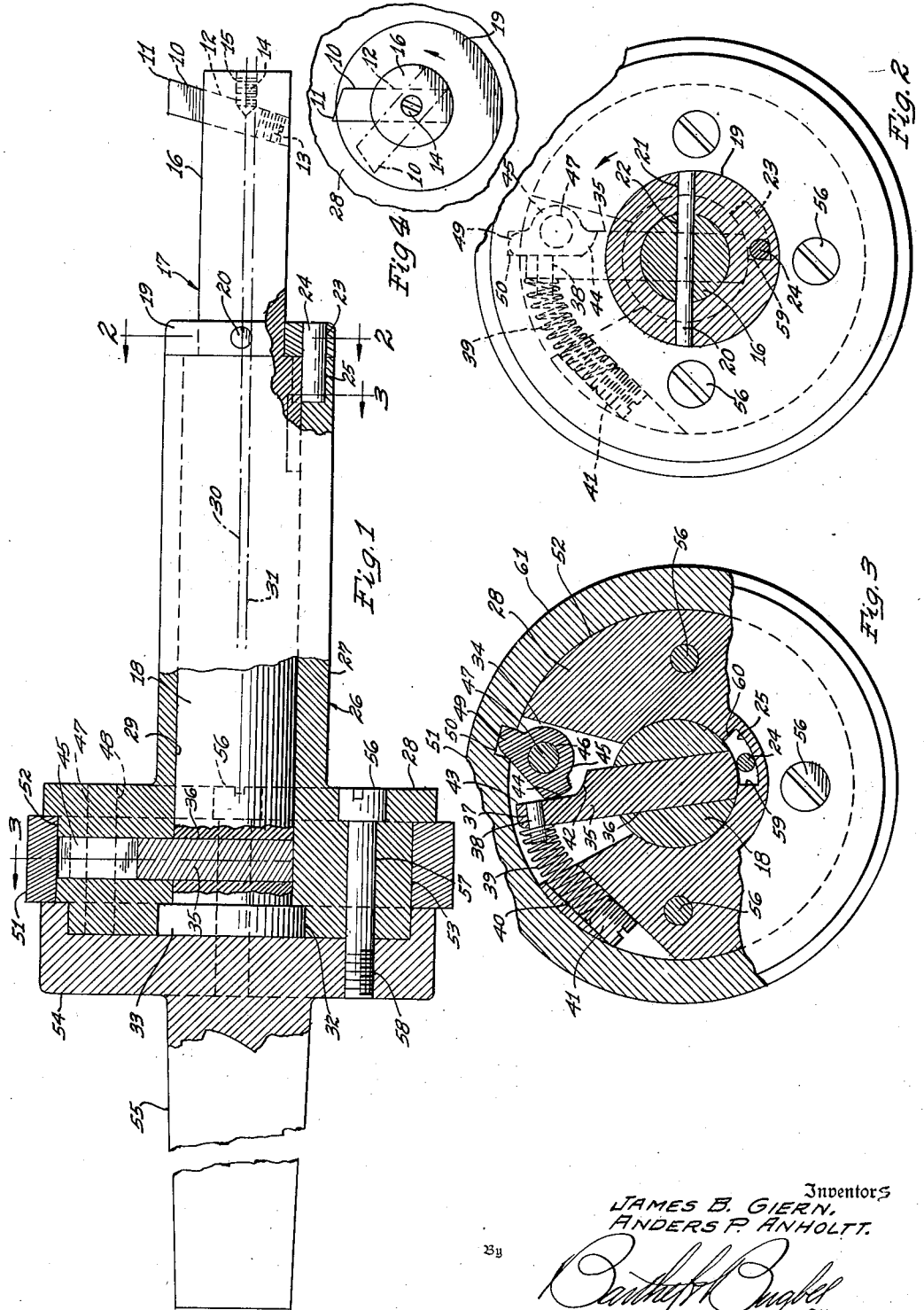
Inventors
JAMES B. GIERN.
ANDERS P. ANHOLTT.
By
Attorneys Patented Apr. 7, 1942

2,278,845

UNITED STATES PATENT OFFICE 2,278,845

RETRACTING BORING DEVICE

James B. Giern and Anders P. Anholtt,
Detroit, Mich.

Application January 8, 1940, Serial No. 312,804

7 Claims. (Cl. 77—58)

This invention relates to boring devices and in particular to such devices having means for withdrawing the boring tool from engagement with the bored surface while the tool is being retracted.

One object of this invention is to provide a retracting boring device wherein means is provided for withdrawing the tip of the boring tool from engagement with the surface being bored, in order to retract the device while the boring tool is out of contact with the surface being bored.

Another object is to provide a retracting boring device having a boring tool equipped with an extremely hard tip, such as a diamond or "Carboloy" tip wherein means is provided for withdrawing the hardened tip from engagement with the work so as to retract the boring tool without scarring the work or dulling the tool.

Another object is to provide a retracting boring device wherein the tool is mounted for swinging around an axis which is eccentric to the axis of rotation of the boring tool, means being provided for swinging the tool so that its tip is withdrawn from engagement with the work during the retraction stroke of the machine.

Another object is to provide a retracting boring device equipped with a diamond tipped tool, or the like, wherein the tool is yieldingly held against swinging around a different axis and shorter radius than the axis of rotation of the boring tool, so that when the tool is thus swung around a shorter radius than the radius of rotation, it is then withdrawn from engagement with the work and hence does not form a hair line thereon or develop lips on the tool during the retraction stroke of the boring device.

In the drawing:

Fig. 1 is a side elevation, partly in central vertical section, of a retracting boring device according to one embodiment of the invention;

Fig. 2 is a cross section taken along the line 2—2 of Fig. 1 showing the relative positions of the parts during the boring operation;

Fig. 3 is an elongated section taken along the broken line 3—3 of Fig. 1, showing the relative positions of the moving parts when the device is operated to withdraw the tool from engagement with the work during a retraction stroke; and Fig. 4 is a diagrammatic right hand end elevation of a portion of the device showing the relative positions of the tip of the boring tool in the boring position and retracting position respectively.

In general, the retracting boring device of this invention consists of a shaft carrying the boring tool and arranged for partial rotation in a bore having an axis which is eccentric to the axis of rotation of the mount containing the bore. The shaft thus swings the tip of the boring tool on a shorter radius than the radius of the path of the tool during boring. The mount for the shaft consists of a sleeve-like member upon which is mounted a T-shaped trigger.

One end of the T-shaped trigger engages a dog mounted on the tool shaft, whereas, the other end engages an internal notch in a ring surrounding the sleeve-like member. A spring urges the flat portion of the dog into engagement with the flat top of the T-shaped trigger. Secured to the sleeve-like member is a head provided with a standard tapered shank by which the device is mounted in the boring machine. This arrangement enables the tool shaft to be partially rotated relatively to the sleeve-like member by grasping or otherwise braking the ring, thereby swinging the tool shaft so that the tip of the tool rotates in a path having a shorter radius than the radius of its path during boring. A stop is provided for accurately causing the tip of the tool to return to a predetermined position during the next boring operation.

Hitherto in conducting boring operations, particularly with the use of diamond-tipped or similar boring tools, when the boring tool was retracted after the completion of a boring operation, the tip of the tool left a hair line on the wall of the bore. Occasionally also, the retraction developed a lip on the tool. Prior attempts at withdrawing the tip of the tool from engagement with the bore while the boring tool is being retracted have involved mechanism whereby it was difficult to be sure that the tool would be returned to its previous position or to a definitely known position. Since the stock removed in this diamond boring operation is a matter of a few thousandths or ten thousandths of an inch, according to the circumstances, it will be seen that it is vitally necessary to be able to return the tip of the tool accurately to its previous position or to a position the location of which is accurately known relative to its previous position. The device of the present invention enables this to be done in a simple and accurate manner.

Referring to the drawing in detail, Fig. 1 shows a preferred embodiment of the invention as consisting of a boring tool 10 having a tip 11 provided with a hardened material, such as a diamond or a piece of the extremely hard material known to the machine tool art under the trade name of "Carboloy." The boring tool 10 is mounted in an inclined hole 12 and held in position by set screws 13 and 14. The set screw 13 is threaded into the end of the threaded end of the hole 12, whereas, the set screw 14 is threaded into a threaded hole 15 at the end of the extension 16 of the tool shaft, generally designated at 17.

The tool shaft 17 is provided with an enlarged portion 18 beyond the extension 16, the latter carrying a ring 19 secured thereto by a pin 20 passing through apertures 21 and 22 (Fig. 2) in the ring 19 and shaft extension 16, respectively. The ring 19 is provided with a longitudinal hole 23 in which is mounted a stop pin 24. The stop pin 24 extends longitudinally into an arcuate slot 25 (Figs. 2 and 3) in the end of the shaft mount, generally designated 26.

The shaft mount 26 consists of a sleeve portion 27 and a head portion 28 at one end thereof. The sleeve portion 27 is provided with a longitudinal bore 29 having an axis 30 which is eccentric to the axis of rotation 31 of the device as a whole.

The head portion 28 is provided with an enlarged counterbore 32 for receiving the enlargement 33 on the outer end of the tool shaft 17. The head portion 28 is also provided with a sector-shaped recess 34 (Fig. 3) for receiving and permitting a limited swinging of the outer end of rod-like dog 35, the inner end of which is mounted in a radial transverse bore 36 near the end enlargement 33 of the shaft 17.

The outer end of the dog 35 is provided with a hole 37 carrying a pin 38 (Fig. 3). The pin 38 enters and holds in position one end of a coil spring 39, the opposite end of which is seated in a tangential bore 40 in the head portion 28. The opposite end of the bore 40 is threaded to receive a headless seat adjusting screw 41 which serves as an abutment and also has a means for adjusting the force exerted by the spring 39.

The outer end of the dog 35 is provided with a cutaway portion 42 (Fig. 3) having a contact surface 43. The latter is adapted to be engaged by one end 44 of a T-shaped trigger 45 having a bore 46 for pivotally mounting it upon a pivot pin 47. The pivot pin 47 is in turn mounted in a longitudinal bore 48 in the head portion 28 (Fig. 1).

The opposite end 49 of the trigger 45 engages a notch 50 in a ring 51 (Fig. 3). The latter is provided with an internal surface 52 surrounding and engaging the outer surface of the reduced diameter portion 53 of the head portion 28. The ring 51 and the other adjacent parts are held in position by a disk-like head 54 (Fig. 1) carrying a tapered shank 55. The shank 55 is provided with a standard conical taper by which it is mounted in the correspondingly tapered socket of the boring machine. The head 54 and the parts adjacent thereto are held in assembly by set screws 56 passing through bores 57 in the head portion 28 and having their ends threaded into bores 58 in the head 54. The axis of the taper of the shank 55 is the axis of rotation 31 of the device as a whole, whereas, the axis 30 of the sleeve bore 29 around which the boring tool 10 swings is decentered.

In the operation of the invention, the boring tool 10 is adjusted and clamped by means of the set screws 13 and 14 so that its tip 11 rotates in a path of a predetermined radius. This radius is the radius of the bore which is to be machined. The device is then mounted in the boring machine by inserting the tapered shank 55 in the socket provided therefor. A boring operation of the machine is then performed by operating the feeding mechanism. During this boring operation, the tip 11 of the cutting tool 10 describes a circular path around the axis of rotation 31 while it is fed longitudinally by the feeding mechanism of the boring machine. The parts now occupy the positions shown in Figs. 1 and 2 during the boring operation and the stop pin 24 engages the end 59 of the arcuate slot 25.

To withdraw the tip 11 of the boring tool 10 from engagement with the bored surface, prior to effecting a retraction stroke of the device, the operator grasps or otherwise brakes the ring 51. When the ring 51 is thus retarded, the engagement of the trigger arm 49 in the notch 50 causes the trigger 45 to swing around its pivot pin 47 (Fig. 3). This causes the opposite trigger arm 44 to engage the contact surface 43 and swing the dog 35 through an arc against the thrust of a spring 39. Fig. 3 shows the swinging partially completed, with the stop pin 24 moving toward the opposite end 60 of the arcuate slot 25. The portion of Fig. 3 showing the slot 25 is taken in a plane considerably to the right of the plane upon which the upper portion of Fig. 3 is taken, as indicated by the broken section line 3—3 in Fig. 1. By thus using an irregular section line, Fig. 3 is caused to show simultaneously the position of the dog 35 and the corresponding position of the stop pin 24 in the arcuate slot 25.

As the dog 35 swings in the manner shown in Fig. 3, the tool shaft 17 rotates about its axis 30, swinging the tip 11 of the tool 10 in an arc about the axis 30. Meanwhile, however, the shaft 17 and tool tip 11 are being rotated bodily about the axis of rotation 31 of the device as a whole. As the tip 11 is nearer the axis 30 than the axis of rotation 31 (which is a boring axis), the tip 11 is swung arcuately upon a shorter radius than its radius of rotation. The relative motion thus produced by the tool shaft 17 and the shaft mount 26 causes the tool tip 11 to approach nearer the axis of rotation 31, as shown in Fig. 4, so that it subsequently rotates upon a shorter radius. The effect of this is to withdraw the tool tip 11 from engagement with the work. The feeding mechanism of the boring machine can then be reversed to retract the boring device. Since, however, the tool tip 11 is withdrawn from engagement with the work, it is thereby prevented from forming a hair line on the work, and the latter is prevented from forming a lip on the tool.

The operator then releases the ring 51, whereupon the spring 39 forces the dog 35 and its associated parts from the position shown in Fig. 3 back into the position shown in Fig. 2. The device is then ready to perform another boring operation, either upon the same boring radius or upon a different boring radius as the tool is readjusted by adjusting the set screws 13 and 14. When the parts thus return to the boring position, the stop pin 31 engages the end 59 of the arcuate slot 25 (Fig. 2) thereby causing the tool tip 11 to return to the identical position which it previously occupied. In this way, the tool tip 11 is caused to return to the identical radius from the axis of rotation which it previously occupied, thereby guaranteeing a subsequent bore which is of exactly the same diameter as the bore previously machined. In this manner, the boring operations can be repeated indefinitely and the same diameter of bore produced.

For simplicity of showing and description, the ring 51 is described as being grasped by the operator in order to operate the dog 52 to swing the tool shaft 17 relatively to the shaft mount 26. In practice, however, it is also found convenient to engage the ring 51 by a brake band applied to its outer surface 61. This brake band may be operated mechanically or electrically, as by a solenoid. The retardation of the ring 51, by being thus braked, instantly swings the dog 35 so as to withdraw the tool tip 11 from engagement with the work, and its release instantly returns the tool tip 11 to its boring position, under the urge of the spring 39 and the action of the stop pin 24.

While a specific embodiment of the invention has been described and illustrated, it will be understood that various modifications may be made within the scope of the appended claims without departing from the spirit of the invention.

What we claim is:

1. In a retracting boring device, a rotatable tool mount having a bore with an axis decentered relatively to the center of the axis of rotation thereof, a tool holder having a portion rotatably engaging said bore, a boring tool secured to said tool holder, expansible means for rotating said tool holder relatively to said bore in a direction to project said boring tool into its boring position, and manually controlled means for rotating said tool holder in another direction to retract said boring tool from its boring position, the axis of rotation of said tool holder in said tool mount having a shorter radius to the cutting portion of said tool than the radius from the axis of rotation of said tool mount to said cutting portion.

2. In a retracting boring device, a rotatable tool mount having a bore with an axis decentered relatively to the center of the axis of rotation thereof, a tool holder having a portion rotatably engaging said bore, a boring tool secured to said tool holder, expansible means for rotating said tool holder relatively to said bore in a direction to project said boring tool into its boring position, manually controlled means for rotating said tool holder in another direction to retract said boring tool from its boring position, the axis of rotation of said tool holder in said tool mount having a shorter radius to the cutting portion of said tool than the radius from the axis of rotation of said tool mount to said cutting portion, and stop means for limiting the rotation by said expansible means of said tool holder relatively to said tool mount into boring position.

3. In a retracting boring device, a rotatable tool mount having a bore with an axis decentered relatively to the axis of rotation thereof, a tool holder having a shaft portion rotatable in said bore, a boring tool secured to said tool holder, means for urging said tool holder to rotate in a direction to project said boring tool into its boring position, a tool holder rotator operatively connected to rotate said tool holder, an externally operable operating member surrounding said rotator and responsive to the retardation thereof to rotate said tool holder in a direction to retract said boring tool from its boring position, and motion transmitting mechanism operatively inter-connecting said tool holder rotator with said operating member.

4. In a retracting boring device, a rotatable tool mount having a bore with an axis decentered relatively to the axis of rotation thereof, a tool holder having a shaft portion rotatable in said bore, a boring tool secured to said tool holder, means for urging said tool holder to rotate in a direction to project said boring tool into its boring position, a tool holder rotator operatively connected to rotate said tool holder, an externally-operable operating ring surrounding said rotator and responsive to the retardation thereof to rotate said tool holder in a direction to retract said boring tool from its boring position, and a pivoted member having one portion engaging said tool holder rotator and another portion engaging said operating ring.

5. In a retracting boring device, a rotatable tool mount having a bore with an axis decentered relatively to the axis of rotation thereof, a tool holder having a shaft portion rotatable in said bore, a boring tool secured to said tool holder, means for urging said tool holder to rotate in a direction to project said boring tool into its boring position, a dog connected to said tool holder, an externally-operable operating member encircling said dog, and means responsive to the retardation of said operating member for shifting said dog to rotate said shaft portion relatively to said tool mount and around said decentered axis in a direction to retract said boring tool from its boring position.

6. In a retracting boring device, a rotatable tool mount having a bore with an axis decentered relatively to the axis of rotation thereof, a tool holder having a shaft portion rotatable in said bore, a boring tool secured to said tool holder, means for urging said tool holder to rotate in a direction to project said boring tool into its boring position, a dog connected to said tool holder, an externally operable operating member encircling said dog and responsive to the retardation thereof to rotate said tool holder in a direction to retract said boring tool from its boring position, and a pivoted element having one arm engaging said dog and another arm operatively engaging said operating member.

7. In a retracting boring device, a rotatable tool mount having a bore with an axis decentered relatively to the axis of rotation thereof, a tool holder having a shaft portion rotatable in said bore, a boring tool secured to said tool holder, means for urging said tool holder to rotate in a direction to project said boring tool into its boring position, a dog connected to said tool holder, an externally-operable operating member encircling said dog and responsive to the retardation thereof to rotate said tool holder in a direction to retract said boring tool from its boring position, said operating member having an arm engaging portion thereon, and a pivoted element having one arm operatively engaging said dog and another arm operatively engaging said arm engaging portion.

JAMES B. GIERN.
ANDERS P. ANHOLTT.